(12) United States Patent
Modlin

(10) Patent No.: US 7,321,618 B2
(45) Date of Patent: Jan. 22, 2008

(54) PCM UPSTREAM DATA TRANSMISSION SERVER

(75) Inventor: Cory Samuel Modlin, Chevy Chase, MD (US)

(73) Assignee: Texas Instruments Incorporated, Dallas, TX (US)

( * ) Notice: Subject to any disclaimer, the term of this patent is extended or adjusted under 35 U.S.C. 154(b) by 836 days.

(21) Appl. No.: 10/118,377

(22) Filed: Apr. 9, 2002

(65) Prior Publication Data

US 2003/0189976 A1 Oct. 9, 2003

(51) Int. Cl.
*H03H 7/40* (2006.01)
*H03K 5/159* (2006.01)

(52) U.S. Cl. ............ 375/229; 375/240.02; 375/240.29; 375/240.03; 375/240.04

(58) Field of Classification Search ................ 375/232; 360/53; 714/708
See application file for complete search history.

(56) References Cited

U.S. PATENT DOCUMENTS

| | | | | |
|---|---|---|---|---|
| 5,754,353 | A * | 5/1998 | Behrens et al. | 360/53 |
| 6,072,825 | A * | 6/2000 | Betts et al. | 375/222 |
| 6,141,388 | A * | 10/2000 | Servais et al. | 375/262 |
| 6,173,015 | B1 | 1/2001 | Eyuboglu et al. | 375/286 |
| 6,181,752 | B1 | 1/2001 | Kim | 375/346 |
| 6,198,776 | B1 * | 3/2001 | Eyuboglu et al. | 375/286 |
| 6,201,836 | B1 | 3/2001 | Kim | 375/265 |
| 6,256,339 | B1 * | 7/2001 | Kaewell, Jr. | 375/147 |
| 6,266,376 | B1 | 7/2001 | Pilozzi et al. | 375/254 |
| 6,445,733 | B1 * | 9/2002 | Zuranski et al. | 375/231 |
| 6,570,917 | B1 * | 5/2003 | Lai et al. | 375/232 |
| 6,606,355 | B1 * | 8/2003 | Wei | 375/242 |
| 6,662,322 | B1 * | 12/2003 | Abdelilah et al. | 714/708 |

FOREIGN PATENT DOCUMENTS

EP 1124359 A2 8/2001

OTHER PUBLICATIONS

Rajiv Laroia; Coding for Intersymbol Interference Channels-Combined Coding and Precoding; IEEE Transactions on Information Theory, vol. 42, No. 4, Jul. 1996; pp. 1053-1061.

* cited by examiner

*Primary Examiner*—David C Payne
*Assistant Examiner*—Linda Wong
(74) *Attorney, Agent, or Firm*—Steven A. Shaw; W. James Brady; Frederick J. Telecky, Jr.

(57) ABSTRACT

A method for designing an equalizer and tracking performance for upstream PCM in a digital communications network is described. The invention optimizes upstream data rate rates for data transmissions in a network between a client modem a server modem. During training, the upstream channel impulse response is identified compensating for any robbed bit signalling. The upstream transmit equalizer is computed in closed form based on the identified channel. An equalizer in the receiver is also used to track timing and channel variations. The invention approximates bit error rate performance by looking for code violations in the trellis code decoder and tracking their frequency. The bit error rate is used to determine if the current modem parameters need to be re-designed.

11 Claims, 2 Drawing Sheets

FIG. 4
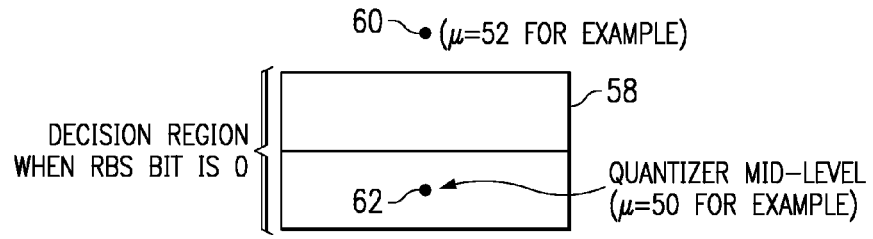
FIG. 5
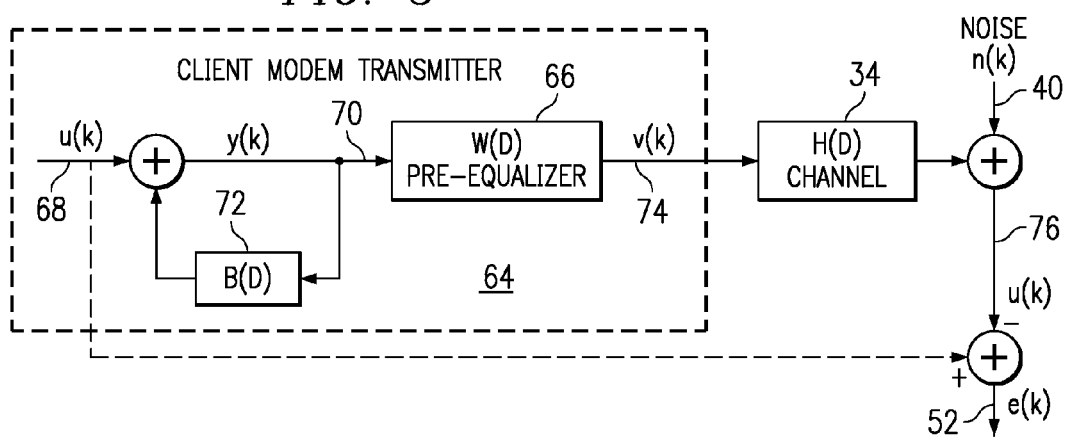
FIG. 6
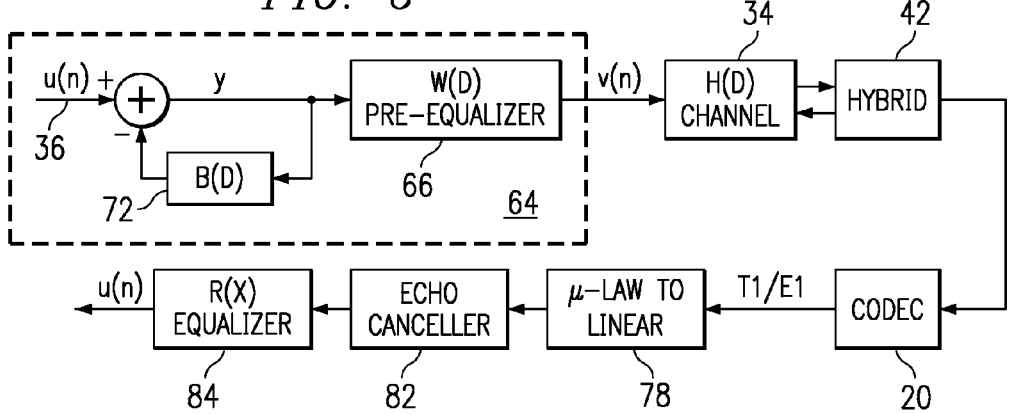
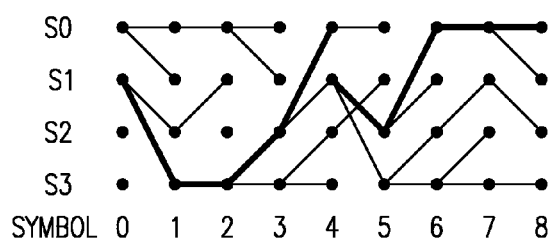
FIG. 7

PCM UPSTREAM DATA TRANSMISSION SERVER

CROSS-REFERENCE TO RELATED APPLICATIONS

None

FIELD OF THE INVENTION

This invention relates to a method and device for providing pulse code modulation (PCM) data transmission for networks, such a network implementing PCM upstream voice-band modem transmissions.

BACKGROUND OF THE INVENTION

Personal computers connecting to networks through the public switched telephone system (PSTN) typically use a modem to dial-up a network connection through analog telephone lines. These client, or end user, modems transmit data signals converted to digital source through an analog channel through a network. Due to the increase in data, voice, and facsimile traffic over the telecommunications infrastructure, methods to increase the digital and analog transfer rates through modems over telephone lines are extremely useful and necessary to adhere to International Telecommunication Union (ITU) standards. The Telecommunication Standardization Sector of the ITU (ITU-T) adopted V.34 Recommendation in 1994, which is incorporated herein, to define modem operating speeds rom 28.8 kilobyte per second (kbps) up to 33.6 kbps. However, data transfer rates are limited over the PSTN. In modems built to V.34 standards of the International Telecommunications Union (ITU), and all previous voice-band modem standards, carrier-modulated quadrature amplitude modulation (QAM) is used to quantize the analog signals using u-law (or A-law for some standards outside of the U.S.) pulse code modulation (PCM) codecs. In such a system, the carrier frequency and symbol rate are chosen to match the channel, not the codec. However, in many cases there is a direct digital connection upstream of the analog client modem between a central office (CO) of the PSTN and a server modem on a digital network. PCM modems are built to take advantage of networks used by internet service providers or others connected to the PSTN through a digital connection, such as T1 in the United States and E1 in Europe. PCM modems use either standards for "PCM downstream" modulation, as described in ITU V.90, or "PCM upstream, as described in ITU V.92 recommendations. A connection between a client modem on a local loop of the PSTN and a connection on the digital network can be referred to as a "PCM channel".

In PCM downstream, data is transmitted in PCM mode downstream from a central office to an end user's analog modem, i.e. from server to client. The digital PCM modem at the server transmits over a digital network in eight bit digital words called octets that correspond to different central office codec output levels. At the client modem's central office, the octets are converted to analog levels which are transmitted over an analog loop. The client PCM modem then converts the analog levels back to digital signals, or pulse code amplitude (PAM) signals, and into equalized digital levels. The equalized digital levels are ideally mapped back into the originally transmitted octets that the octets represent.

When using PCM downstream modulation, the client modem synchronizes to the central office codec and tries to determine exactly which PCM sample was transmitted in each sample. In codecs throughout the world, the codec clock is 8000 Hz. Since there are 255 different μ-law levels and 256 different A-law levels, the data rates could go as high as nearly 64 kbps (8 bits/sample at 8000 samples/second). Practically, because the smallest levels are often too small to distinguish and because of regulatory power limits on the transmit signal, the highest data rate is listed as 56 kbps although even that is usually higher than what most channels will support. In PCM downstream, the client modem must implement an equalizer to undo the effects of intersymbol interference caused by the channel (the telephone line plus the analog front-end of the codec and client modems) in order to recover the PCM levels.

In PCM upstream modulation, the client modem transmits analog levels to the digital server modem over an analog loop. The analog levels are modified by the channel characteristics of the analog loop. The modified levels are quantized to form octets by a codec in the central office. In PCM upstream, the channel comes before the codec further limiting the highest possible data rate. The codec then transmits the octets to the PCM server modem over the digital network. At the server modem, the levels transmitted by the client are demodulated from the octets, thereby recovering the data sent from the client modem.

If the client modem were simply to transmit PCM levels, the channel would distort the levels so that when it reached the codec, they would not resemble the transmitted levels at all. The server modem is not able to equalize the receive signals until after the codec and therefore can not limit the effect of quantization noise. In order to take advantage of the PCM codec in the upstream direction, the client modem must implement an equalizer in the transmitter to undo the effects of intersymbol interference.

Some patents in the field of PCM upstream transmissions include the following: U.S. Pat. No. 6,173,015 B1, DEVICE AND METHOD FOR PRECODING DATA SIGNALS FOR PCM TRANSMISSION, that teaches precoding a sequence of analog levels transmitted over an analog channel, which modifies the transmitted analog levels, to a quantization device that includes a mapping device for mapping data bits to be transmitted to a sequence of equivalence classes, a constellation point selector interconnected to the mapping device which selects a constellation point in each equivalence class to represent the data bits to be transmitted and which transmits a level that produces the selected constellation point at an input to the quantization device; U.S. Pat. No. 6,181,752 B1, DEVICE AND METHOD FOR DETECTING PCM UPSTREAM DIGITAL IMPAIRMENTS IN A COMMUNICATION NETWORK, that teaches detecting digital impairments affecting an upstream pulse code modulation channel in a digital communications network by receiving a random sequence of digital values selected from a constellation of digital values transmitted over the upstream PCM channel of the digital communications network, establishing distributions of the received digital values, and deriving from the distributions the types of robbed bit signaling and digital loss affecting the upstream PCM channel of the digital communication network for each time interval; U.S. Pat. No. 6,198,776 B1, DEVICE AND METHOD FOR PRECODING DATA SIGNALS FOR PCM TRANSMISSION, that teaches a transmitter for transmitting a sequence of analog levels over an analog channel to a quantization device, wherein the analog channel modifies the transmitted analog levels; U.S. Pat. No. 6,266,376 B1, SYSTEM AND METHOD FOR ADJUSTING PCM DATA FRAMES FOR ROBBED BIT SIGNALING IN A TELEPHONE NETWORK, that teaches shifting the relative phases of a PCM data frame and a network RBS frame by one or more symbols to determine whether or not RBS is present; and U.S. Pat. No. 6,201,836 B1, METHOD AND APPARATUS FOR COMBINING A TRELLIS CODE SCHEME WITH A PRE-CODING SCHEME FOR DATA SIGNALS, that teaches a system that receives input bits from a user that define an equivalence class which has at least one constellation point, wherein one of the constellation points in the equivalence class is chosen to represent an output of a channel and a redundancy bit is calculated from the output of the channel and is used to define a next equivalence class for the system.

Recommendation V.92 states that the convolutional encoders from Recommendation V.34 shall be used for V.92. ITU-T Recommendation V.34 are standards for a modem operating at data signaling rates of up to 33,600 bits/s for use on the general switched telephone network and on leased point-to-point 2-wire telephone type circuits. The standard utilizes quadrature amplitude modulation for each channel with synchronous line transmission at selectable symbol rates including the mandatory rates of 2400, 3000, 3200 symbols/s and the optional rates of 2743, 2800 and 3429 symbols/s. The standard may use trellis coding for all data signaling rates. Trellis encoding is a method for improving noise immunity using a convolutional coder to select a sequence of subsets in a partitioned signal constellation. The trellis encoders used in the ITU recommendation are used in a feedback structure where the inputs to the trellis encoder are derived from the signal points.

Trellis coded modulation (TCM) is one of the coding standards recommended under the V.34 modem communications standard. Trellis codes using lattices of dimensions larger than two have been constructed and have several advantages. Two dimensional (2D) symbols are grouped in pairs to form four-dimensional (4D) symbol intervals. Multidimensional trellis code signals as a basis for signal constellations are a theoretical concept, since, in practice, multidimensional signals are transmitted as sequences of one or two dimensional signals. Doubling the constellation size reduces the minimum distance within the constellation, and this reduction has to be compensated for by the code before any coding gain can be achieved. Using a 4D signal set causes the constituent 2D constellations to be expanded by a factor of only square root of two, having half a bit of redundancy per 2D constellation.

The decoding operation comprises finding the correct path through the trellis that most closely represents the received binary sequence. The decoder finds a path for the received binary sequence that has the minimum Euclidian distance from the received sequence. The iterative procedure accomplishing the decoding is the Viterbi algorithm. The algorithm uses forward dynamic programming to select the best, or minimum distance, path through a trellis. At each node, in the trellis, the only path retained is the best path, therefore limiting the number of retained paths at any time instant to the total number of trellis nodes at that time.

There are a number of factors that limit the PCM upstream data rate more than the PCM downstream data rate and provide additional challenges. Regulatory limits on the client modem transmit power mean that the higher the upstream channel attenuation, the lower the upstream data rate. In the downstream direction, only the signal-to-noise ratio (SNR) limits downstream performance. The echo from the downstream signal is added before the codec. Even a perfect echo canceller in the server modem can not remove the quantization noise caused by the echo. The equalizer in the client transmitter can not continually adapt to changing channel conditions as can the receive equalizer used for PCM downstream. The only way to adapt the transmit equalizer in V.92 is for the server to notify the client through a rate renegotiation. The timing recovery done by the client modem in the upstream direction is more difficult that in the downstream direction.

Due to these and other problems in PCM upstream transmissions, the levels transmitted by the client PCM modem are modified. Since these modified levels are quantized to form octets by the codec, and not the levels that are actually transmitted, it can be difficult for the server modem to accurately determine from the octets the data being transmitted by the client modem.

Therefore, a need exists for a device and method for undoing the negative effects of the channel and network interferences with PCM upstream transmissions.

SUMMARY OF THE INVENTION

The invention relates to a method and device for providing pulse code modulation (PCM) data transmission for networks, such a network implementing PCM upstream voice-band modem transmissions. More specifically, the invention establishes a channel for upstream pulse code modulation (PCM) in a digital communications network is described. The invention optimizes upstream data rate rates for data transmissions in a network under V.92 standards between a client modem a server modem.

For digital communications between modems sent over analog lines in the public service telephone network (PSTN) to be reasonably free of interference, modems must employ adaptive filters. To design the adaptive filters, noise and robbed bit signaling (RBS) must be accounted for. RBS affects the power of the error in digital signals and estimates of the channel.

The upstream data mode upstream equalizer is chosen from a channel identification rather than using a least mean squares method. The estimate of the channel is affected by RBS and other additive noise, including quantization noise. The upstream equalizer is designed to undo the negative effects of the channel. The analog modem transmitter structure utilizes filters to jointly minimize the power of the error in the channel and to minimize the power of the transmit signal. Minimizing the transmit signal power can be achieved by minimizing the power of the pre-equalizer filter. Noise is not addressed when minimizing the power of the filter because noise is added after the equalizer and the equalizer will not affect its power. The noise is a combination of additive noise and noise from intersymbol interference. The Lagrange multiplier is used in a square matrix to solve for a feedforward filter. The choice of the value of the Lagrange multiplier is a tradeoff between intersymbol interference and the power of the pre-equalizer filter, which affects transmit power. To solve the problem for minimizing the power, an efficient reported algorithm for decision-feedback equalizers and reported results of channel-estimate based equalizers.

A receiver data mode equalizer is used in the server, or digital, modem that compensates for small misadjustments caused by timing drift from the client modem. A least mean squares method is used to update the receiver equalizer. Severe changes in the channel are compensated through a rate renegotiation.

The described method detects and corrects errors in transmissions with a trellis search in a decoder of said server modem using a low-pass filter to track error events in said trellis. The method issues a fallback on the trellis if error calculations exceed a predetermined threshold and a fallforward if error calculations fall below a second predetermined threshold.

BRIEF DESCRIPTION OF THE DRAWINGS

Preferred embodiments of the invention are discussed hereinafter in reference to the drawings, in which:

FIG. 4 is an example of quantization modified by robbed bit signaling;

FIG. 5 is a flowchart of the client modem transmitter and the PCM channel;

FIG. 6 is a diagram of the upstream receiver;

FIG. 7 is an illustration of a trellis branch.

DETAILED DESCRIPTION OF THE INVENTION

There is described herein a technique for equalizer designs and channel error detections for a PCM upstream data transmission between a digital PCM server modem and a PCM analog client modem.

Figure 1:
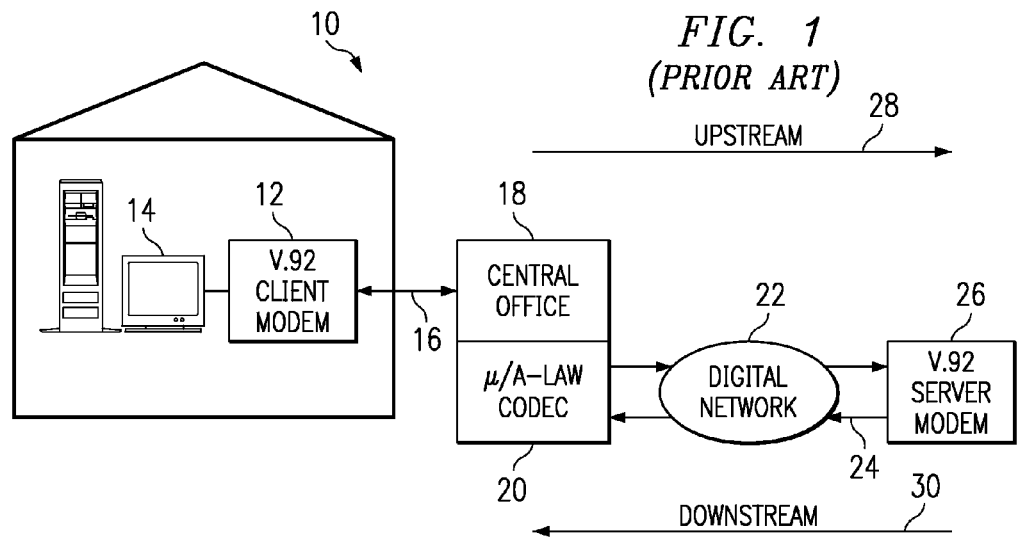
FIG. 1 is a diagram of a PCM a communications network.

When connecting two modems over the public switched telephone network (PSTN), digital data from a central office (CO) often must be translated from digital signals at the server modem into analog tones for transmission over a local analog line to a client modem. At each client modem, the received analog waveform is sampled and quantized by an analog to digital convertor (A/D). A PCM upstream network with a voice-band modem connection is illustrated in FIG. 1. The network 10 includes a V.92 PCM client modem 12 from an end user's personal computer 14 connected to an analog telephone line 16, or channel. The analog channel 16 is connected to a telephone company central office (CO) 18 wherein the analog levels are quantized using a μ- or A-law codec 20. There is also a digital network 22 which is interconnected to the CO 18 and to the digital transmission channel, which may comprise a T1, E1, or ISDN line 24. A V.92 server modem 26 completes the connection in the upstream direction. Data may transmit in either the downstream direction (server to client modem) 28 or the upstream direction 30 (client to server modem).

For digital symbols transmitted over the analog channel to be reasonably free of intersymbol interference over the frequency spectrum used by the symbols, modems employ adaptive filters called equalizers. Equalization is a technique used to compensate for distortion in analog signal lines. One of the distortions which is compensated for is intersymbol interference. Equalizers in a receiver neutralize intersymbol interference which would cause high bit error rates if left uncompensated. Equalization is accomplished by passing the digital signal through a filter whose tap coefficients are adjusted so that the combination of channel plus equalizer is some known response. When the channel is properly equalized, data can be recovered reliably from the received symbols. Modems equalize the incoming signals by employing various types of equalizers include linear equalizers, decision-feedback equalizer, and trellis-based Viterbi equalizers. The equalizer taps of a minimum mean-square-error decision-feedback equalizer (MMSE-DFE) can be directly computed by Givens rotations without back-substitution and matrix-vector multiplication, as discussed in the paper "An Improved Fast Algorithm for Computing the MMSE Decision-Feedback Equalizer" by Bin Yang, Int. J. Electron. Commun., 51 (1999) No. 1, 1-8, which is incorporated herein by reference.

Figure 2:
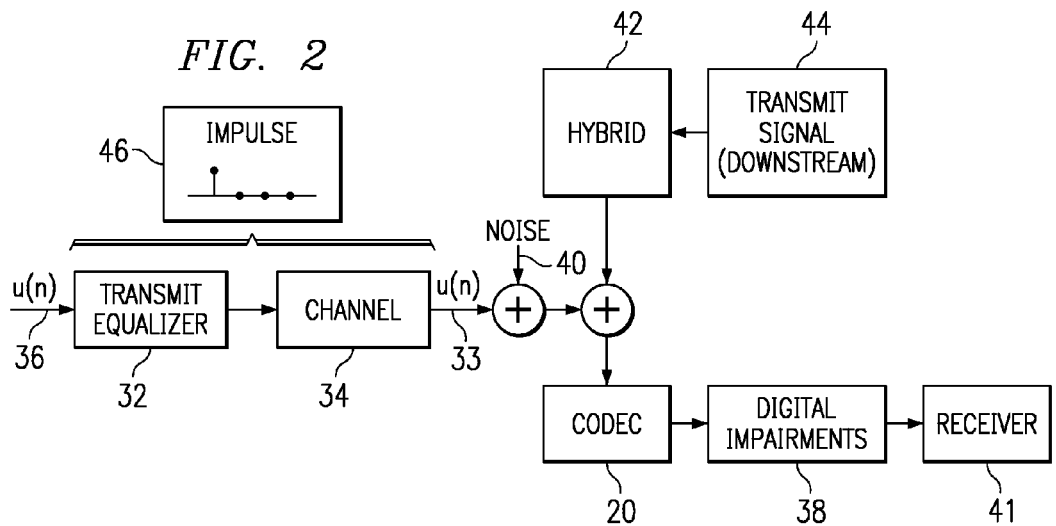
FIG. 2 is a diagram of a PCM upstream channel.

Referring to FIG. 2, there is illustrated in block diagram the effective PCM upstream channel 34. In this figure, the transmit equalizer 32 is designed to undo the negative effects of the channel so that the same signal, u(n) 36, appears before and after the combination of the equalizer 32 and channel 34. The input values, u(n), are chosen from a constellation of points as determined by the server modem 26 (see section 6.4.2 in ITU-T/V.92). Because of the echo, the constellation of points will not correspond exactly to the PCM codec levels. However, it is still true, as in PCM downstream modulation, that there are more constellation points possible at smaller signal levels than at larger levels.

Digital impairments 38 include digital pads (digital gain) and robbed-bit-signaling (RBS). RBS is a technique used in T1 network connections where the least significant bit of each nth data octet is replaced with a control bit by the network for control signaling. For any one RBS link, the frequency of robbed bits through a single T1 connection is one every sixth symbol. This "in-band" signaling is used to indicate things like "off-hook", "ringing", "busy signal", etc. RBS results in data impairment by changing transmitted bit values. RBS must be detected and the signaling bit ignored when present. Another problem with RBS in networks is where the link between two modems includes several different digital legs such that the number of RBS links is variable from one connection to another.

As mentioned previously, locking the upstream transmitter clock to the CO clock is more challenging than doing timing recovery in the downstream direction. A reasonable client modem implementation might use a phase-locked loop (PLL) for rough timing recovery and might use receive equalizer adaptation for finer timing recovery. Typically, the receiver equalizer updates react more quickly than does a PLL. An equalizer is used in the PCM upstream receiver of the present invention. However, the equalizer comes after the codec and can not prevent upstream timing drift from adding quantization noise. Finally, power line noise 40 interference comes before the codec 20 in PCM upstream. Cancellation after the codec 20 will not eliminate the added quantization noise and will distort the received signal.

Figure 3:
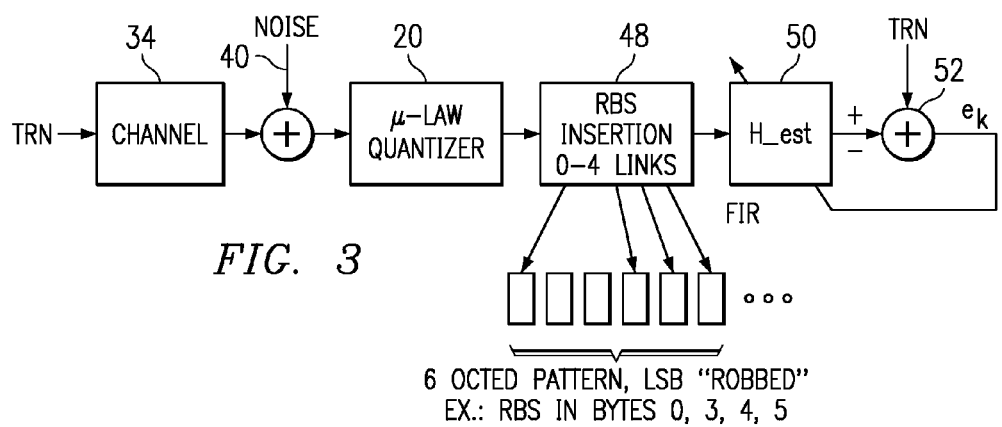
FIG. 3 is a PCM channel with robbed bit signaling.

To design the data mode upstream equalizer for PCM upstream, a channel identification is performed both during V.92 training events TRN1u and TRN2u. This provides adequate time for the channel to converge. An unbiased channel identification can be performed using least mean squares (LMS). The length of the channel is 96 samples, and the filters will converge in less than 2 seconds with LMS. FIG. 3 is a block diagram illustrating the LMS update setup. Once the estimate of the channel, H_est 50, has converged, the power of the error signal, $e_k$ 52, should be close to the average power of the additive noise and quantization noise.

Robbed bit signaling (RBS) 48 is present is nearly all T1 connections but is not present in E1. In RBS, the least significant bit in every $6^{th}$ μ-law sample is replaced (or robbed) with signaling information. The signaling pattern is never longer than 4 bits long. Therefore, the pattern repeats every 24 μ-law samples. There can also be more than one RBS signaling channel. One channel might affect samples 0, 6, 12, 18 . . . while a second channel might affect samples 3, 9, 15, 21, . . . The PN3857 test standard allows for up to four RBS links. RBS will also affect the constellation design in PCM upstream. When there is RBS, the space between adjacent claw samples effectively doubles. Therefore, the phase(s) containing RBS should be detected an tracked.

RBS detection in the upstream direction can be simplified since the μ-law samples are directly accessed. Over some period where any signal is being received, the least significant bit (LSB) from a block of 24 samples is stored. Then, these bits are compared to the subsequent block of 24 samples. The phases on which there is no RBS are expected to vary randomly between 1 and 0. On those samples with RBS, the same values are detected in every block, while the number of differences detected are tracked. If there is no RBS, the probability of k differences in n observations of the LSB is $$P = \binom{n}{k}.5^n$$

For 100 observations, the probability of fewer than eight (for example) observed bit differences is ~$10^{-19}$. RBS is detected if fewer than eight differences are observed on any of the 24 phases.

Once RBS is detected, samples with RBS can be adjusted to compensate for the average offset. This will affect the identified channel and the designed equalizer. The received samples can be adjusted by converting to a linear sample halfway between the RBS sample and the RBS sample with the RBS bit inverted. For example, if a sample known to have RBS inserted is received with value $\mu$=50, then the RBS bit was 0. The linear value corresponding to $\mu$=50 is −3644 and to $\mu$=51 is −3516. The linear sample should be set to the average of −3580.

RBS will also affect the power of the error signal and the estimated channel. Referring to FIG. 4, the decision region 58 is skewed when RBS is present. The decision point 60 is not in the middle 62 of the decision region 58. For example, if the RBS bit is a 0, then positive samples will have an average positive offset caused by the RBS and negative samples will have an average negative offset. Assuming that the echo and additive noise are large enough to make the quantizer error nearly uniform, the extra noise power caused by the offset decision point is 2.4 dB.

The estimated channel using LMS will be affected by RBS. If the RBS pattern is constant (all ones or all zeros), the channel will reach a compromise between the samples with and without RBS. This effect is illustrated in FIG. 5 where the measured SNR is plotted for samples with and without RBS depending on the number of RBS links. In the following formula, variable k is an index from 0 to 5 representing one of the six RBS phases. Then err_power_est(k)=$\Sigma e_n$ for n=k through length(e) in steps of 6 (ex. 2, 8, 14 . . . for k=2)  (1)

The goal of the upstream equalizer in this invention is to undo the negative effects of the channel on PCM upstream data transmissions. The effective channel after the equalization is illustrated in FIG. 2. In the present invention, the design of the upstream data mode equalizer is chosen from a channel identification rather than by using LMS. There are two main reasons for this. First, the channel typically has nulls at DC and Nyquist creating a wide eigenvalue spread in the channel auto-correlation. This means that the convergence time is very long, taking many seconds. In many instances, the equalizer will not converge at all. Second, a decision feedback equalizer designed using LMS with the received samples attempts to minimize the overall error including the quantization noise, which is not the optimal filter. If LMS is used with the recovered channel, the complexity of re-creating the channel is added and the convergence problem still exists.

In FIG. 5 there is illustrated a block an example diagram of the client modem transmitter 64. The equalizer 66 is within the client modem transmitter. In FIG. 5, there is included input signal u(k) 68 which feeds into the client modem transmitter 64. Filtered signal y(k) 70 from filter B(D) 72 feeds pre-equalizer W(D) 66. Signal v(k) 74 exits W(D) 66 and enters the analog channel H(D) 34, wherein noise 40 is added to the signal u(k). Filters B(D) 72 and pre-equalizer W(D) 66 are designed to jointly minimize the power of the error, $e_k$ 52, and to minimize the power of the transmit signal, $v_k$ 74.

Writing an equation for the error results in $$e_k = u_{k-\Delta} - [w\ b]\begin{bmatrix} H\ y_k \\ u_{k-\Delta-1} \end{bmatrix} \quad (2)$$

where w and b are finite length row vectors (length $n_{ff}$ and $n_{fb}$ respectively), H is a Toeplitz channel matrix ($n_{ff} \times n_{ff}+v-1$), $u_k$ is a vector of data input samples of length $n_{ff}+v-1$, and $u_{k-\Delta}$ is a length $n_{ff}$ vector of input samples delayed by $\Delta$. The length of the channel is $v$.

The power of the error, $e_k$ should be minimized along with minimizing the transmit signal power. Since the feedforward filter, w, is generally spectrally flat, minimizing the transmit power can be achieved by minimizing the power of the filter, $w\ w^T$. In a zero-forcing DFE, the feedforward filter is an all-pass filter. In the present invention, it will be nearly all-pass and roughly flat. The Lagrange multiplier is used to solve this problem. By setting $d(e)/d[w\ b]+\lambda d(w\ w^T)/d[w\ b]=0$ where $\lambda$ is some constant and solve for w and b, subject to the constraint that b(0)=1 (unit tap constraint) to prevent the trivial solution w=0.

$$[w\ b]^T = \begin{bmatrix} HH^T + \lambda I & H_{\Delta+1\Delta+n_{fb}} \\ H_{\Delta+1\Delta+n_{fb}}^T & I \end{bmatrix}^{-1} \begin{bmatrix} H_\Delta \\ 0 \end{bmatrix} \quad (3)$$

is found where $H_{\Delta+1\Delta_{+n_{fb}}}$ represents the $\Delta$ through $\Delta+n_{fb}^{th}$ column of the matrix, H and $H_\Delta$ is the $\Delta^{th}$ column of the matrix, H, and I is the identity matrix (a square matrix with dimensions $n_{fb}$). This solves the equation for the case when the input sequence, u(k), is independent and identically distributed (as is approximately the case here). The noise does not appear in this equation because it is added after the equalizer and the equalizer will not affect its power. The noise is the combination of the additive noise and any noise from intersymbol interference caused by imperfect equalization. The choice of the value of $\lambda$ in the above equation is a trade-off between intersymbol interference and the power of the pre-equalizer filter which affects the transmit power. As the power of the pre-equalizer filter grows, the possible values of u(k) must be limited to stay within regulatory power limits. However, as intersymbol interference grows, the receive signal becomes noisier meaning that the space between constellation points needs to be greater, which also limits the data rate. The above equation (3) is solved for a number of values of $\lambda$ and over a variety of filter lengths. Values for $\lambda$ are chosen and the number of filter taps are selected to maximize the overall data rate.

The present invention accordingly solves equation (3) with a method based on results from Al-Dhahir and Cioffi, see N. Al-Dhahir, J. Cioffi, "Fast Computation of Channel-Estimate Based Equalizers in Packet Data Transmission," IEEE Trans. Sig. Proc., November 95, (the "Al-Dhahir Method") which is incorporated by reference, and an efficient algorithm by Yang, see B. Yang, "An Improved Fast Algorithm for Computing the MMSE Decision-Feedback Equalizer," AEU Int. J. Electron. Commun., 51 (1999) No. 1,1-8, which is incorporated by reference. This method solves equation (3) for the special case where $\Delta=n_{ff}-1$ and $n_{fb}=v$. This restriction does not significantly affect performance. Using Yang, a two row matrix is created:

$$A_0 = \begin{bmatrix} \lambda 0...0...0 & 0...0\left(\frac{1}{\lambda}h_{\nu-1}\right)...\left(\frac{1}{\lambda}h_0\right) \\ h_0h_1...h_{\nu-1} \mid 0...0...0...0...0...0...0 \end{bmatrix}$$

where the values, h, are the result of the channel ID and λ is the Lagrange multiplier constant that empirically selected based on simulation results. The left part of the matrix has ν columns. Performing $n_{\mathit{ff}}$ Givens rotations, the matrix A contains $$A_{n_{\mathit{ff}}} = \begin{bmatrix} 1b_1...b_{n_{\mathit{fb}}-1} \mid w_0w_1...w_{n_{\mathit{ff}}-1} \\  \  \  \  \mid  \  \  \ * \end{bmatrix}$$

which is the desired result.

The Givens rotations are performed using the algorithm described in W. M. Gentleman, "Least Squares Computations by Givens Transformations Without Square Roots," J. Inst. Maths Applies, 1973, pages 329-336, which is incorporated by reference.

There is illustrated in FIG. 6 an exemplary embodiment of PCM upstream transmission in accordance with the present invention. In the diagram there is included a client modem transmitter 64 interconnected to analog channel 34 having channel characteristic H(D). Client modem transmitter 64 includes precoder B(D) 72 and pre-equalizer W(D) 66. Precoder 72 receives digital data u(n) 36 and outputs precoded dital data signal v(n) 37 that is transmitted over analog channel 34. The signal passes through hybrid 42 and is received by the codec 20 in a central office 18. From the codec 20, the signal is received into a u-law (or A-law in some countries outside the United States) quantizer 78 and is quantized according to the u-law to a linear output. The digital signal is then transmitted upstream over a digital network 22 to the server modem receiver 80 and received by an echo canceller 82 in a digital PCM modem wherein echo is removed from the signal. After echo canceller, the signal is received by equalizer 84 having characteristic R(X) that outputs equalized signal u(n).

If a power line interference adjustment filter is used, the length of the feedback filter is increased by 16 taps and the length of the feedforward filter is increased by 16 taps. At this point, if the total number of taps or the number of feedforward taps exceeds the limits, the feedforward filter is shortened by preserving the taps with the most energy.

Rate renegotiation and retrains are used by both server and client modems to update filters, change rates, and possibly to change the modulation. In the present invention, for PCM upstream server implementation, a rate renegotiation is issued to adjust the transmit equalizer and constellation, which may or may not change the upstream data rate. The decision about whether or not to issue a rate renegotiation or retrain is made based on detected errors in the trellis decoder.

In V.34 and V.90 modulations, the error between the equalizer output and the sliced equalizer output could be used to determine whether or not a rate renegotiation was needed. In PCM upstream, this is not possible. The reason is that the errors will be higher for larger (greater magnitude) constellation points than for the smaller points. The error power also depends on the echo. Therefore, the average equalizer error power is meaningless and attempts to weight smaller values more heavily and to take the echo power into account are not reliable.

A reliable method of detecting the approximate bit error rate is required for determining whether or not a rate renegotiation or retrain is required. Using the trellis search required for the decoder allows reliable error detection. The trellis search is a common implementation of a maximum likelihood detector. The trellis search works by comparing the actual received values with the ideal values calculated along every branch in a trellis. A branch connects one state at symbol=n with another state at symbol=n+1. Typically there are more than one branches that enter and leave each state. The ideal values are based on the code selected. Metrics are kept for every state in the trellis and branch metrics are calculated for every possible branch in the trellis for every received symbol. The branch metrics are added to the state metrics from where the branches originate. The next state is chosen from all the branches leading into that state by selecting the smallest metric.

The coding gain of the trellis search comes because the decision is delayed by tracing back through the trellis. An example 4-state trellis with only the surviving paths is shown in FIG. 7. In this example, assume that a starting point at any state at symbol=4. If the path is traced back to symbol=0, all paths lead to state S1. This means that S1 is the most likely state at symbol=0.

Assume, for example, that the smallest metric at symbol=4 was state S0. Assume trace-backs are performed in blocks of 4 samples. Then assume at symbol=8 the path is traced back from any state. At symbol=4, the most likely state was actually S1. Discrepancies such as those in the example do not necessarily indicate an error, but they do indicate that the noise is sufficient to have caused a symbol-by-symbol error.

When a discrepancy is found between the best estimate at the final state in the trellis during the previous block and the best estimate at the same state by having traced back from the current block, an error event is flagged. When a moving average of the number of errors accumulate and surpass a threshold count, the need to perform a rate renegotiation and expand the constellation is indicated. Similarly, when a discrepancy is rarely detected over a long period of time, a smaller constellation is preferred and a rate renegotiation is issued to possibly increase the data rate.

When an error event is logged, the flag is set to 1, otherwise the flag is set to 0. A simple low-pass filter is used to make the determination:

$$a_k = (1 - 2^{-n})a_{k-1} + \begin{cases} 1 & \text{if there were errors} \\ 0 & \text{if there were no errors} \end{cases}$$

If a exceeds some threshold, a fallback is declared; if a falls below another threshold, a fallforward is declared. The values of n and the thresholds were determined through off-line simulations with a target bit error rate of $10^{-5}$.

The present invention also uses a receiver data mode equalizer in the server modem. The receiver data mode equalizer compensates for timing drift in the client transmitter. A small timing drift is tolerable. However, a large phase shift will add considerable quantization noise which can not be compensated by the receive equalizer. LMS is used to update the receive equalizer. This equalizer is only 16 taps for the present invention. A smaller number of taps is used because empirical testing determined that the LMS misadjustment was significant for larger filters, and a 16-tap filter is sufficient to compensate for timing drift. Other, more severe changes in the channel, can be compensated through a rate renegotiation.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for pulse code modulation upstream data transmissions in a network between a client and a server comprising:
   performing a channel identification to obtain a channel length v and a channel estimate;
   calculating a client transmit upstream equalizer in closed form using a decision-feedback filter solution that jointly optimizes an amount of intersymbol interference and a transmit power; and
   identifying an error signal in said equalizer with filters w and b within said equalizer with formula $$e_k = u_{k-\Delta} - [w\ b]\begin{bmatrix} Hy_k \\ u_{k-\Delta-1} \end{bmatrix}$$

where w and b are finite length row vectors of length $n_{ff}$ and $n_{fb}$, respectively, $n_{ff}$ and $n_{fb} \geq 1$, H is a Toeplitz channel matrix ($n_{ff} \times n_{ff}+v-1$), $u_k$ is a vector of data input samples of length $n_{ff}+v-1$, $u_{k-\Delta}$ is a length $n_{ff}$ vector of input samples delayed by $\Delta$, and k is an integer.

2. The method of claim 1, further comprising:
   compensating for at least one effect of robbed bit signaling by linearly interpolating between the two possible μ-law levels when robbed bit signaling is present to ensure an unbiased channel estimate.

3. The method of claim 1, further comprising:
   maximizing an overall performance by jointly minimizing power of the error signal and power of a transmit filter w, subject to the constraint b(0)=1; wherein the joint minimization can be written as $$d(e)/d[wb]+\lambda d(ww^T)/d[wb]=0$$

where λ is some constant and is solved for w and b by writing the matrix $$[w\ b]^T = \begin{bmatrix} HH^T + \lambda I & H_{\Delta+1\Delta+n_{fb}} \\ H^T_{\Delta+1\Delta+n_{fb}} & I \end{bmatrix}^{-1} \begin{bmatrix} H_\Delta \\ 0 \end{bmatrix}$$

where λ is a Lagrange multiplier constant, $H_\Delta+I:_{\Delta+nfb}$ represents the Δ through $\Delta+n_{fb}^{th}$ column of the matrix H, I is an identity matrix (a square matrix with dimensions $n_{fb}$), wherein the Lagrange multiplier λ and a number of filter taps are selected to maximize an overall data rate, and T is a matrix transpose operation.

4. The method of claim 3, wherein:
   said matrix is solved where $\Delta=n_{ff}-1$ and $n_{fb}=V$ using Al-Dhahir method.

5. The method of claim 4, wherein:
   a two row matrix is written as $$A_0 = \begin{bmatrix} \lambda 0...0...0 & | & 0...0\left(\frac{1}{\lambda}h_{v-1}\right)...\left(\frac{1}{\lambda}h_0\right) \\ h_0h_1...h_{v-1} & | & 0...0...0...0...0...0...0 \end{bmatrix}$$

where the values, h, are a result of performing a channel identification and λ is a Lagrange multiplier constant that is selected based on simulation results, left part of the matrix has v columns; and
performing $n_{ff}$ Givens rotations, matrix $A_{aff}$ contains $$A_{nff} = \begin{bmatrix} 1b_1...b_{nfb-1} & | & w_0w_1...w_{nff-1} \\ \ \ \  & | & \ \ \ * \end{bmatrix}.$$

6. The method of claim 1, further comprising:
   assigning a flag of "0" or "1" at regular time intervals depending on if a discrepency is noted in final traceback state in the Viterbi decoder between two times;
   applying a low-pass filter to the flag; and
   deriving the approximate bit error rate.

7. The method of claim 6, wherein:
   said low-pass filter uses the following formula to log an error event:
   wherein if a $$a_k = (1-2^n)a_{k-1} + \begin{cases} 1 \text{ if the exceeds a first threshold,} \\ 0 \text{ if ther corrective actions are taken to} \end{cases}$$

address high bit error rate, and if a falls below a second threshold, said corrective actions toward increasing the data rate, and values of n and the thresholds are determined through simulations with a given target bit error rate.

8. A method for pulse code modulation upstream data transmissions in a network between a client, having a transmitter, and a server, said method comprising:
   performing a channel identification to design an equalizer;
   equalizing said transmissions using a closed form upstream data mode equalizer in said client modem based on said channel identification;
   detecting errors in said transmissions using a trellis search required by a trellis code decoder;
   using a receiver data mode equalizer to compensate for timing drift and channel variations in said client transmitter, wherein performing the channel identification comprising:
      detecting whether robbed bit signaling is present in a transmission;
      linearly interpolating between possible samples when the robbed bit signaling is present in the transmission;
      indicating a need to perform a rate renegotiation and expand a constellation when a number of possible errors accumulate in said trellis search to surpass a predetermined threshold count, wherein a low-pass filter logs error events, and wherein if the error exceeds the a first predetermined threshold count, a data rate reduction is declared, and if the error falls below a second predetermined threshold count, a data rate increase is declared.

9. The method of claim 8, wherein:

said performing channel identification is performed by estimating the channel, and converging the channel using least mean squares.

10. The method of claim 8, further including:

minimizing power of the error signals and transmit signals in said upstream data mode equalizer using filters within said equalizer.

11. The method of 8, wherein:

said receiver equalizer uses a filter to compensate for timing drift of said client transmitter and small variations in the channel.

* * * * *